(12) United States Patent
Omi et al.

(10) Patent No.: US 6,314,853 B1
(45) Date of Patent: Nov. 13, 2001

(54) PORTABLE CUTTING APPARATUS

(75) Inventors: Shohei Omi; Kazuyoshi Inagaki, both of Anjo (JP)

(73) Assignee: Omi Kogyo Co., Ltd., Aichi-Ken (JP)

( * ) Notice: Subject to any disclaimer, the term of this patent is extended or adjusted under 35 U.S.C. 154(b) by 0 days.

(21) Appl. No.: 09/292,656

(22) Filed: Apr. 15, 1999

(30) Foreign Application Priority Data

Apr. 16, 1998 (JP) .................................................. 10-106644

(51) Int. Cl.⁷ ............................... B26D 5/00; B26D 7/02; B26D 7/27; B23D 45/04
(52) U.S. Cl. .................................. 83/743; 83/397; 83/454; 83/456; 83/478; 83/471.2; 83/483; 83/490; 451/347; 451/429
(58) Field of Search ............................ 83/397, 743, 745, 83/452, 454, 455, 456, 464, 478, 471.2, 491, 544, 546, 563, 564, 556, 646, 676, 914, DIG. 2, 483, 490, 477, 477.1, 485, 487; 451/347, 429; 269/231, 269, 278

(56) References Cited

U.S. PATENT DOCUMENTS

| | | | |
|---|---|---|---|
| 1,095,399 | * | 5/1914 | Huntington ........................ 83/471.2 |
| 2,512,419 | * | 6/1950 | Dergance ............................ 83/477.1 |
| 3,834,369 | | 9/1974 | Haase .................................... 125/13 |
| 4,249,443 | * | 2/1981 | Jagers .................................... 83/490 |
| 4,318,324 | * | 3/1982 | Hall et al. ............................. 83/397 |
| 4,335,637 | * | 6/1982 | Kaltenbach ........................... 83/452 |
| 4,531,440 | * | 7/1985 | Lucky ................................ 83/471.2 |
| 5,146,825 | * | 9/1992 | Dehari ................................... 83/397 |
| 5,438,899 | * | 8/1995 | Hoyer-Ellefsen .................. 83/471.3 |
| 5,486,136 | * | 1/1996 | Noda .................................... 451/347 |

FOREIGN PATENT DOCUMENTS

| | | |
|---|---|---|
| 0780181 A1 | 6/1997 | (EP) . |
| 5-346003 | 12/1993 | (JP) . |

* cited by examiner

*Primary Examiner*—Boyer Ashley
(74) *Attorney, Agent, or Firm*—Sheridan Ross P.C.

(57) ABSTRACT

A cutting apparatus for cutting a rail or other elongated workpiece includes a rotatable blade for cutting the rail, a blade cover for covering the blade, an engine (or motor) for driving the blade, and a frame for supporting the blade, the blade cover and the driver. The cutting apparatus further includes link mechanisms. One link mechanism supports the blade and the blade cover relative to the frame and permits the blade cover to move while maintaining a predetermined attitude during cutting. Therefore, the blade cover moves vertically and avoids hitting obstacles. Another link mechanism moves the driver while maintaining a predetermined attitude of the driver. Therefore, the driver remains level during cutting.

4 Claims, 12 Drawing Sheets

Front ←→ Rear

Fig.12(Prior Art)

PORTABLE CUTTING APPARATUS

BACKGROUND OF THE INVENTION

The present invention relates to a cutting apparatus for cutting elongated objects, such as rails or pipes.

Figure 12:
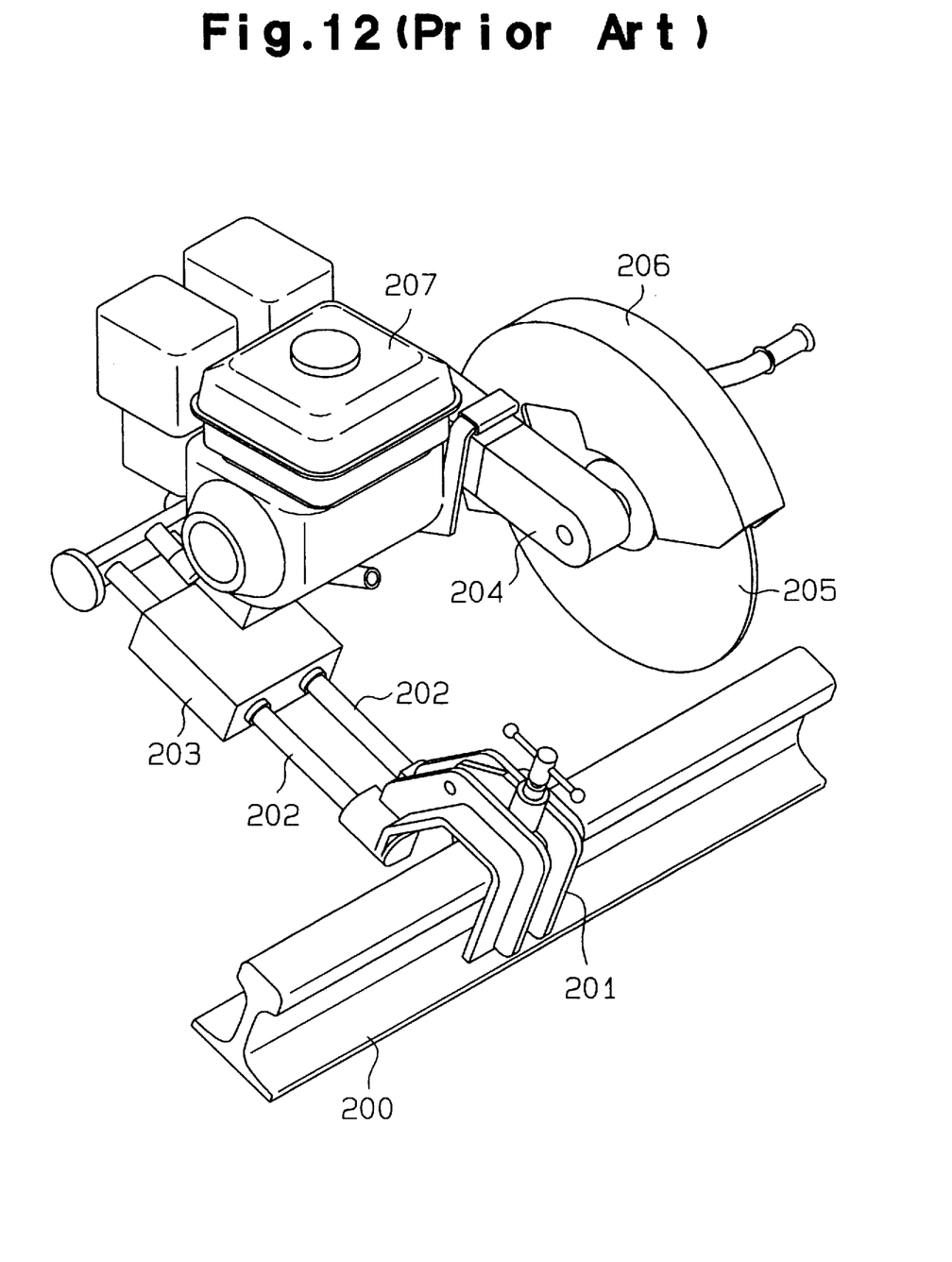
FIG. 12 is a perspective view of a prior art cutting apparatus.

A prior art rail cutting apparatus is disclosed in Japanese unexamined patent publication No. 5-346003. As shown in FIG. 12, the rail cutting apparatus includes a catch frame 201 for fixing a rail 200. A pair of slide shafts 202 extends from a rear end of the catch frame 201. A block 203 is slidably supported by the slide shafts 202. An arm 204 is tiltably supported by the block 203. The arm 204 supports a rotatable blade 205 for cutting the rail 201, a blade cover 206 and an engine 207 for driving the rotatable blade 205.

As the arm 204 is tilted downward, the rotatable blade 205 moves toward and cuts the rail 200. However, when the arm 204 is tilted downward, the blade cover 206 and the engine 207 also tilt along with the arm 204. Therefore, if an obstacle is located on or near the rail 200, the blade cover 206 and/or the engine 207 may contact the obstacle and disturb the cutting operation. Furthermore, when the engine 207 is tilted, the oil level of the engine 207 is changed, and the float of the engine's carburetor is moved, so the performance of the engine 207 is affected, and the risk of engine trouble is increased.

SUMMARY OF THE INVENTION

An objective of the present invention is to provide a cutting apparatus that has an improved structure for supporting a blade cover and an engine.

For achieving the objective of the present invention, a cutting apparatus for cutting an elongated workpiece includes a rotatable blade for cutting the rail, a blade cover for covering the blade, a driver for driving the blade, and a frame for supporting the blade, the blade cover and the driver. The cutting apparatus further includes at least one of a first link mechanism and a second link mechanism. The first link mechanism supports the blade and the blade cover relative to the frame and permits the blade cover to move while maintaining substantially the same attitude during cutting. The second link mechanism moves the driver while the driver maintains a substantially constant attitude.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objectives and advantages thereof, may best be understood by reference to the following description of the present preferred embodiments together with the accompanying drawings in which:

DETAILED DESCRIPTION OF THE PREFERRED EMBODIMENTS

A cutting apparatus according to a first embodiment of the present invention will be described with reference to accompanying drawings.

As shown in FIGS. 1 to 5, the cutting apparatus includes a frame 11, a positioning device 12 for fixing a workpiece, or rail 28, and a cutter 13 for cutting the rail 28. The positioning device 12 constitutes part of the frame 11. The cutter 13 is mounted on the frame 11.

The frame 11 includes a center frame 15, the positioning device 12, a pair of foldable handles 22, a pair of parallel guide shafts 16, and a rear frame 17.

The center frame 15 is approximately centered in the cutting apparatus and has the positioning device 12 on its front end. The guide shafts 16 extend rearward from the center frame 15. The cutter 13 is slidably supported by the center frame 15 and the guide shafts 16. The rear frame 17 interconnects the rear ends of the guide shafts 16. Wheels 18 are supported at the sides of the rear frame 17. Furthermore, handles 19 are supported at the sides of the rear frame 17.

The positioning device 12 includes a pair of side plates 14, which are fixed to the front end of the center frame 15. A recess 27 for receiving the head 29 of the rail 28 is formed at the lower side of each side plate 14.

Figure 10:
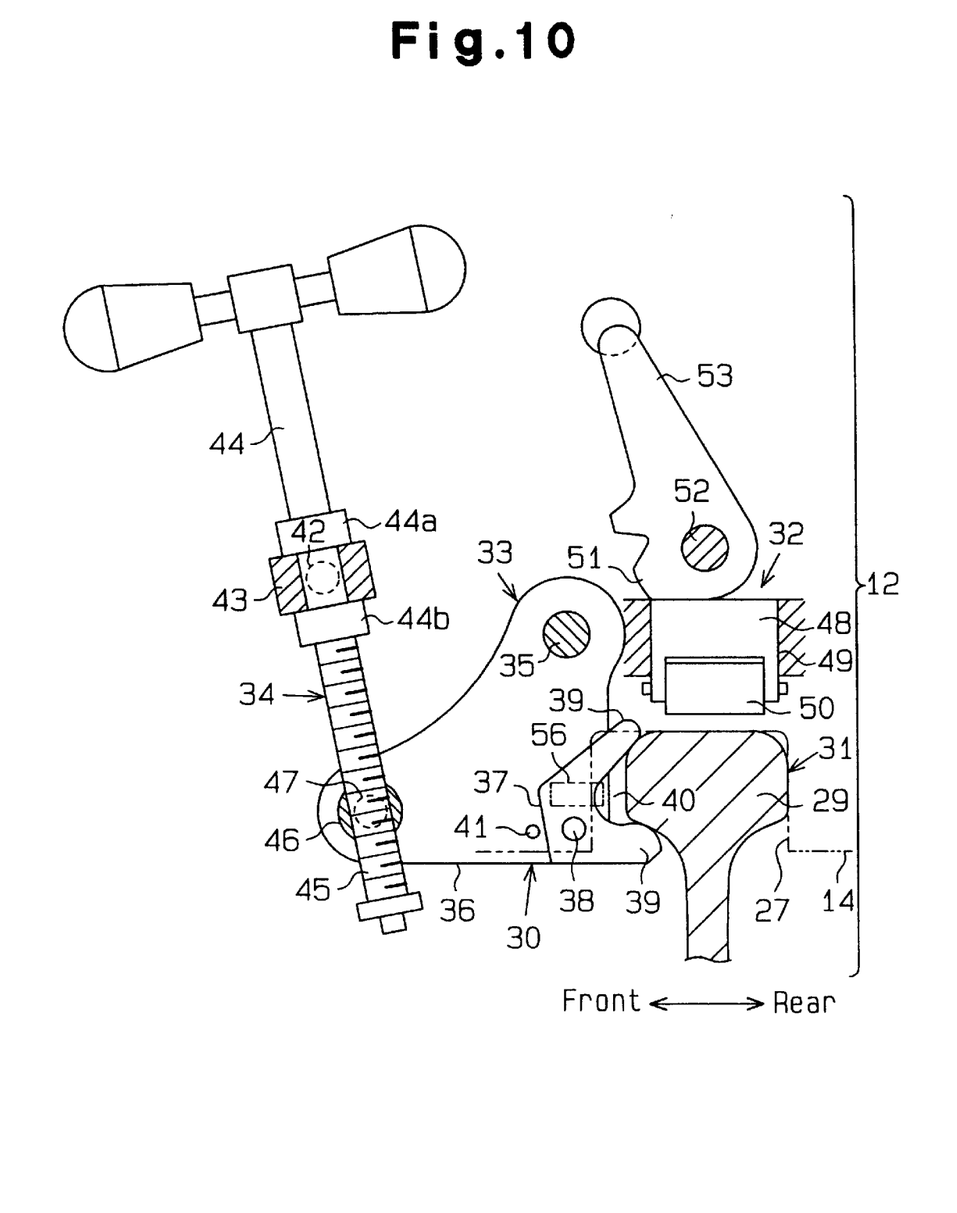
FIG. 10 is an enlarged partial longitudinal cross sectional view of a positioning device while in a position to hold a workpiece.

As shown in FIG. 10, the positioning device 12 further includes a clamping mechanism 30, which has linkage 33 and an operating mechanism, or screw 34. The linkage 33 includes a pair of triangular arm plates 36 and a pawl 37, which is arranged between the arm plates 36. The arm plates 36 are pivotably supported by a supporting shaft 35, which is, in turn, supported by the side plates 14. The pawl 37 is pivotably supported by a shaft 38, which is, in turn, supported by the arm plates 36. The pawl 37 includes a pair of engaging parts 39 and a recess 40, which is formed between the engaging parts 39. The engaging parts 39 respectively engage the upper and lower corners of the rail head 29. The pawl 37 is used to fix the head 29 of the rail 28 by clamping the head 29 between the engaging parts 39 and the rear inner walls of the recesses 27 of the side plates 14. The arm plates 36 include a stopper 41 for limiting rotation of the pawl 37.

The screw 34 includes a shaft 44 and a sleeve 43. A handle is provided at the upper end of the shaft 44. The sleeve 43 is rotatably supported by a pair of coaxial shafts 42. The shafts 42 extend from opposite sides of the sleeve 43 to the left and right side plates 14 and are supported by the side plates 14. The shaft 44 is inserted through the sleeve 43. The shaft 44 has upper and lower flanges 44a, 44b at the upper and lower sides of the sleeve 43 to prevent axial movement of the shaft 44. Threads 45 are formed on the shaft 44 below the lower flange 44b. A cylindrical connector 46 with a threaded hole, which receives the threaded section 45 of the shaft 44, is rotatably supported by a pair of coaxial shafts 47. The shafts 47 extend from opposite sides of the cylindrical connector 46 and are supported by the left and right arm plates 36.

Figure 11:
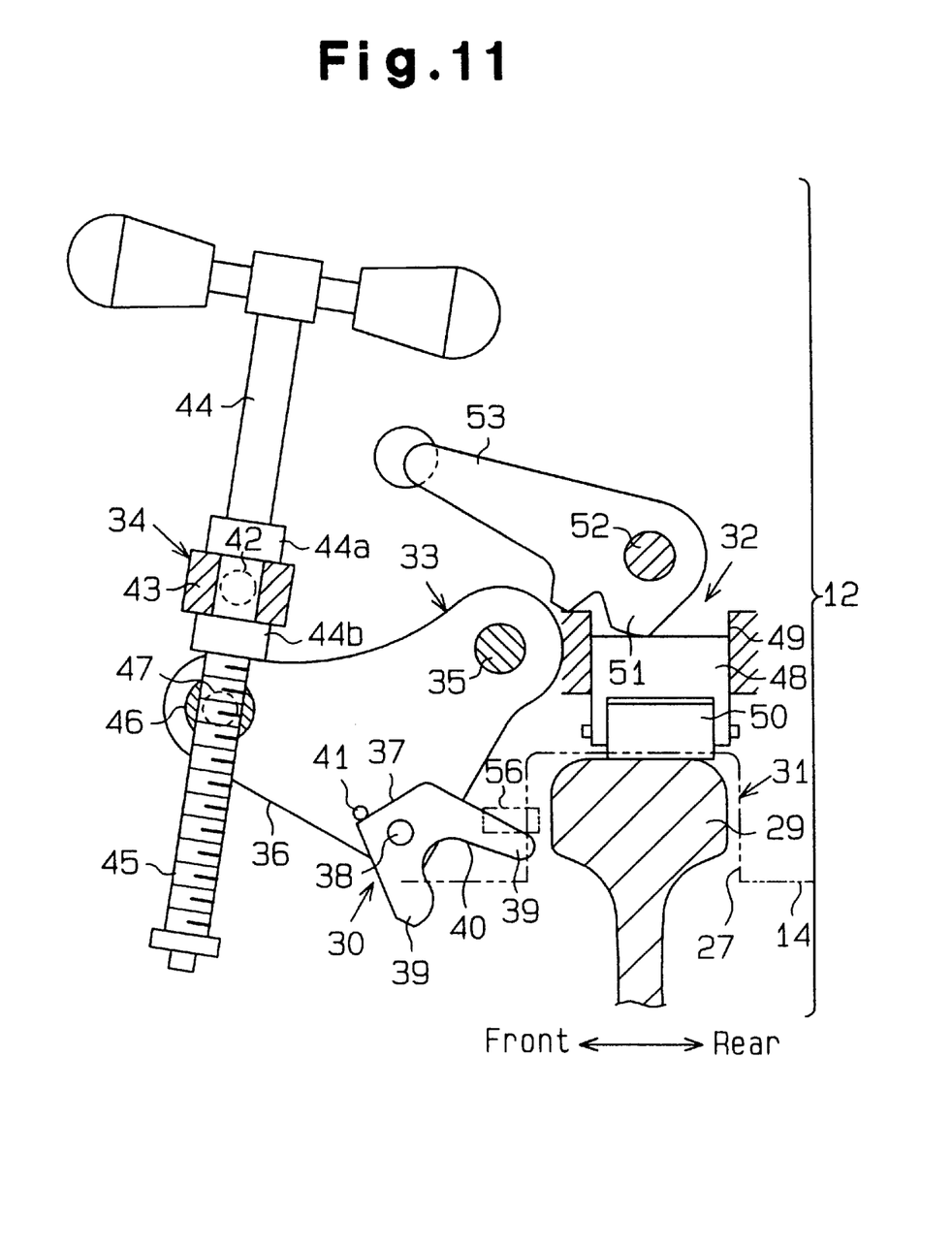
FIG. 11 is an enlarged partial longitudinal cross sectional view of the positioning device while in a position to release a workpiece.

When the shaft 44 is rotated clockwise, the threaded section 45 of the shaft 44 threads into the threaded hole of the cylindrical connector 46 to move the cylindrical connector 46 upward toward the sleeve 43. As the cylindrical connector 46 moves upward, the arm plates 36 pivot upward about the supporting shaft 35 to move the pawl 37 away from the rail head 29. Then, the linkage 33 is retracted, as shown in FIG. 11. During this movement, the distance between the supporting shaft 35 and the shaft 42 and the distance between the supporting shaft 35 and the shaft 47 are fixed, and the distance between the shaft 42 and the shaft 47 is shortened. Therefore, the screw 34 is tilted rearward about the shaft 42. On the other hand, if the shaft 44 is rotated counterclockwise, the distance between the shaft 42 and the shaft 47 is increased to pivot the linkage 33 toward the rail 28 to urge the engaging parts 39 of the pawl 37 against the rail head 29.

In fixing the rail 28 with the positioning device 12, the rail head 29 is, first, received in the recesses 27 of the side plates 14. Then, the shaft 44 is rotated counterclockwise to urge the pawl 37 against the rail head 29, as described above. By urging the pawl 37 against the rail head 29, the rail head 29 is clamped between the pawl 37 and the inner walls of the recesses 27 to fix the rail 28 in the positioning device 12, as shown in FIG. 10.

A guide mechanism 32 is provided adjacent to each of the side plates 14. Each guide mechanism 32 includes a pair of guide walls 49 and a sliding member 48, which is guided by the guide walls 49 to slide in a direction perpendicular to the top of the rail head 29. Each sliding member 48 is urged upwardly by a spring (not shown). Each sliding member 48 includes a roller 50. Each roller 50 can be engaged with the top surface of the rail head 29 against the urging force of the spring by a plate cam 51.

The plate cams 51 are provided adjacent to the inner side walls of the side plates 14 above the guide mechanisms 32, respectively. The plate cams 51 are fixed to a shaft 52, which is pivotably supported by the side plates 14. Each plate cam 51 engages the top surface of the corresponding sliding member 48. An operating lever 53 is integrally formed with one of the plate cams 51. As shown in FIG. 10, during cutting of the rail 28, the rollers 50 are positioned away from the top surface of the rail 28, and the operating lever 53 is raised to a vertical position.

Figure 2:
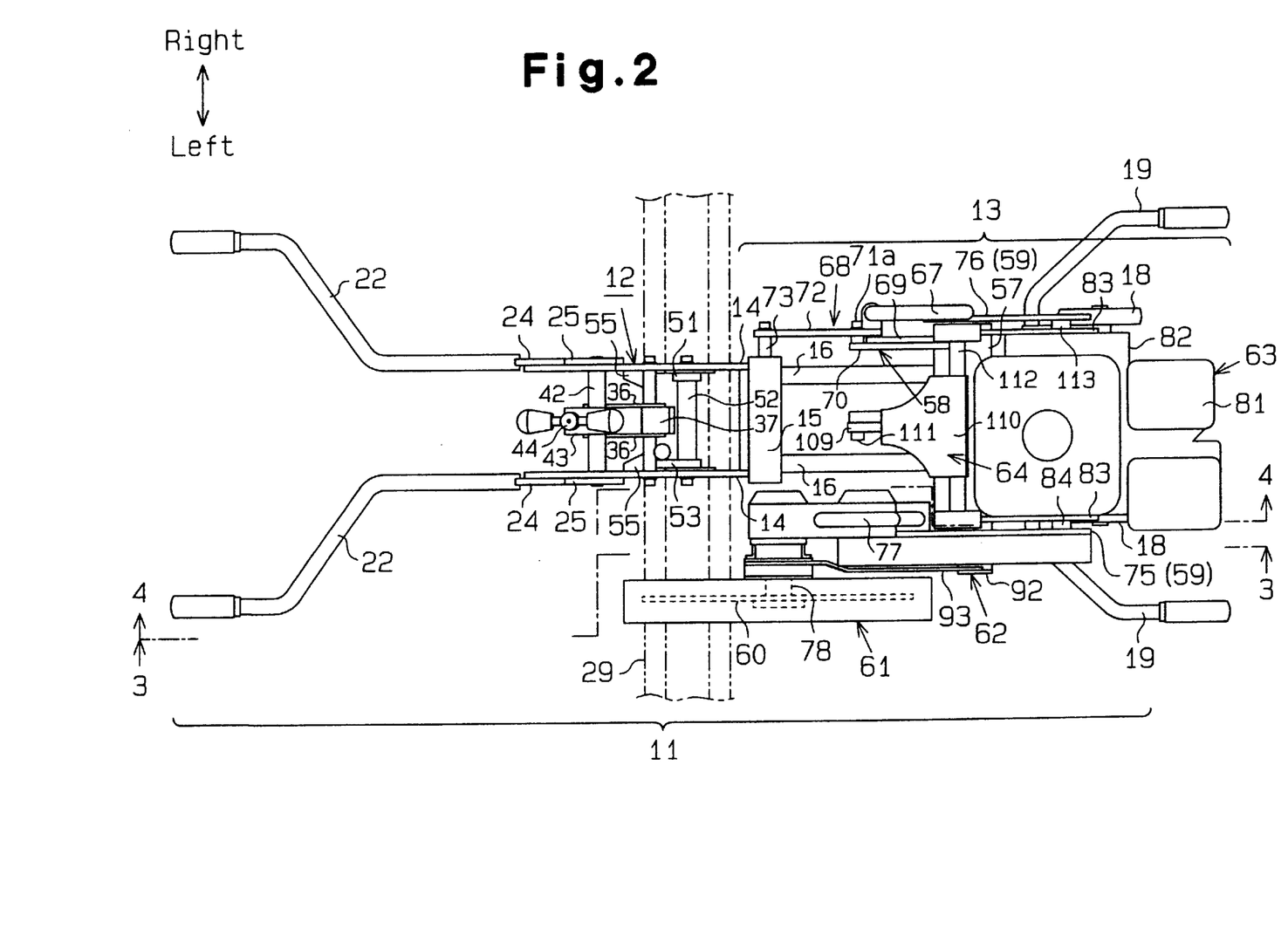
FIG. 2 is a plan view of the cutting apparatus of FIG. 1 showing the pulleys and gears of the transmission covered.

As shown in FIG. 2, the positioning device 12 further includes a pair of brackets 55, which are provided at the inner side walls of the side plates 14, respectively. As shown in FIGS. 10 and 11, each bracket 55 rotatably supports a guide roller 56, the axes of which are vertical. The rolling surface of each guide roller 56 is opposed to the front side of the rail head 29 and can be brought into contact with the front side of the rail head 29.

If the operating lever 53 is pressed downward while the linkage 33 is retracted, each plate cam 51 urges the corresponding sliding member 48 downward against the urging force of the spring. Accordingly, each roller 50 moves downward and contacts the top surface of the rail head 29. When the operating lever 53 is further pressed downward, each roller 50 protrudes from the recess 27 of the side plate 14 to support the weight of the cutting apparatus on the rail head 29 as shown in FIG. 11. This allows the cutting apparatus to slide along the length of the rail 28.

Figure 1:
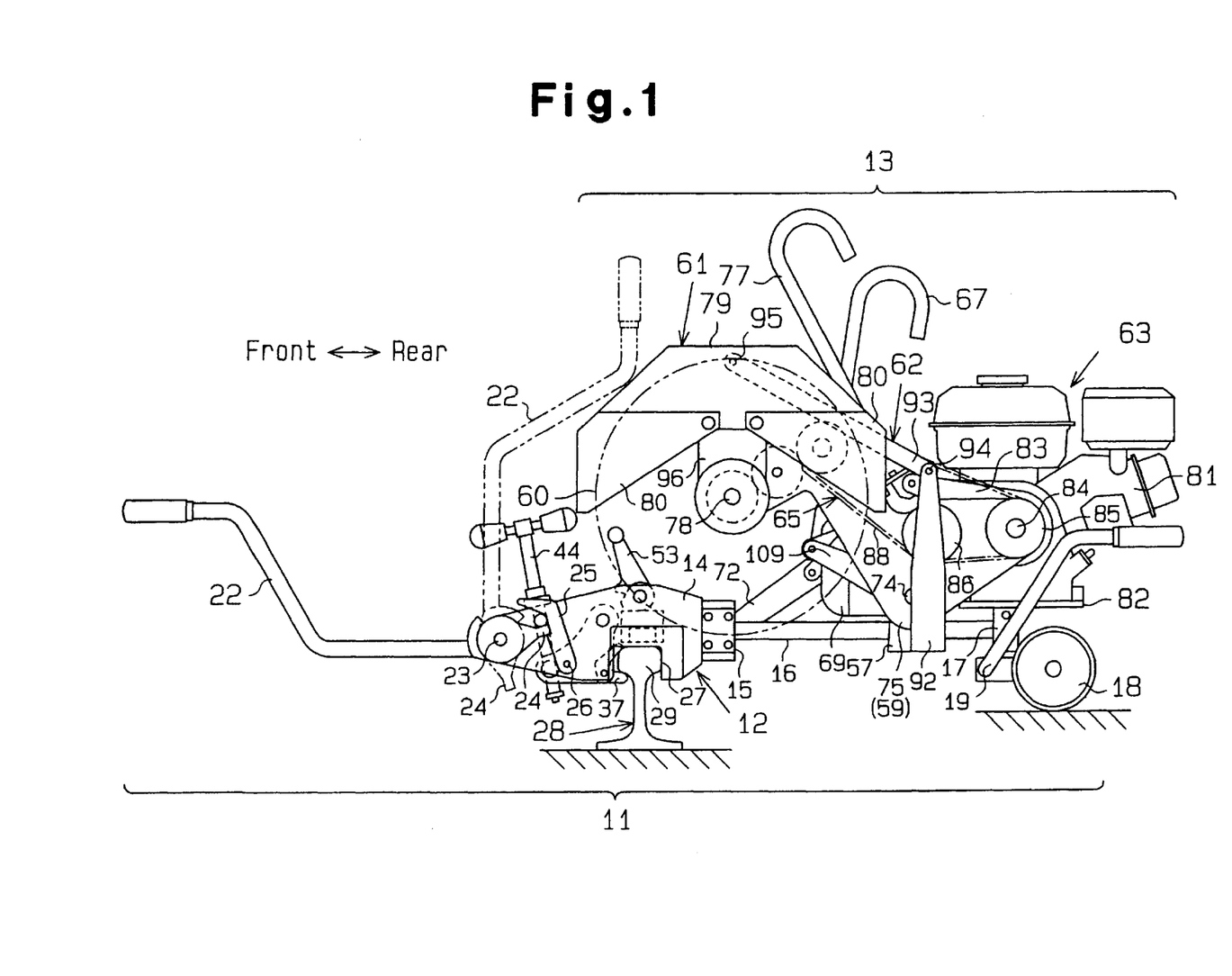
FIG. 1 is a side view of a cutting apparatus in accordance with a first embodiment of the present invention.

As shown in FIG. 1, each handle 22 is pivotally connected to the corresponding side plate 14 with a pin 23. Each handle 22 can be independently folded about the pin 23. A projection 24 is formed at the base end of each handle 22. A lever 25 having a step is pivotally connected to the outer side wall of each side plate 14 with a pin 26. Each lever 25 and the corresponding projection 24 are arranged in a common plane. When one of the projections 24 is engaged by the corresponding step of the corresponding lever 25, the corresponding handle 22 is fixed (shown with a solid line in FIGS. 1, 3 and 4). Therefore, if the handles 22 are lifted, the entire frame 11 tilts upward about the wheels 18. This allows an operator to move the cutting apparatus on the wheels 18. Then, if one of the levers 25 is pivoted rearward, the corresponding step disengages from the corresponding projection 24. This allows the operator to pivot the handles 22 upwardly about the pins 23 to fold the handles 22 (shown with a two dotted line in FIGS. 1, 3 and 4).

As shown in FIGS. 1 to 5, the cutter 13 includes a sliding base 57, which is slidably supported by the guide shafts 16, and an operating mechanism 58 for sliding the sliding base 57 forward or rearward along the guide shafts 16. The cutter 13 further includes a support 59, a rotatable blade 60, a blade cover 61, a first link mechanism 62, an engine 63, a second link mechanism 64 and a transmission 65, the details of which are described later.

The sliding base 57 is supported by the guide shafts 16 and can slide along the guide shafts 16 between the center frame 15 and the rear frame 17. The entire cutter 13 is supported by the sliding base 57. Therefore, the entire cutter 13 moves along with the sliding base 57 to change a distance between the cutter 13 and the positioning device 12.

Figure 4:
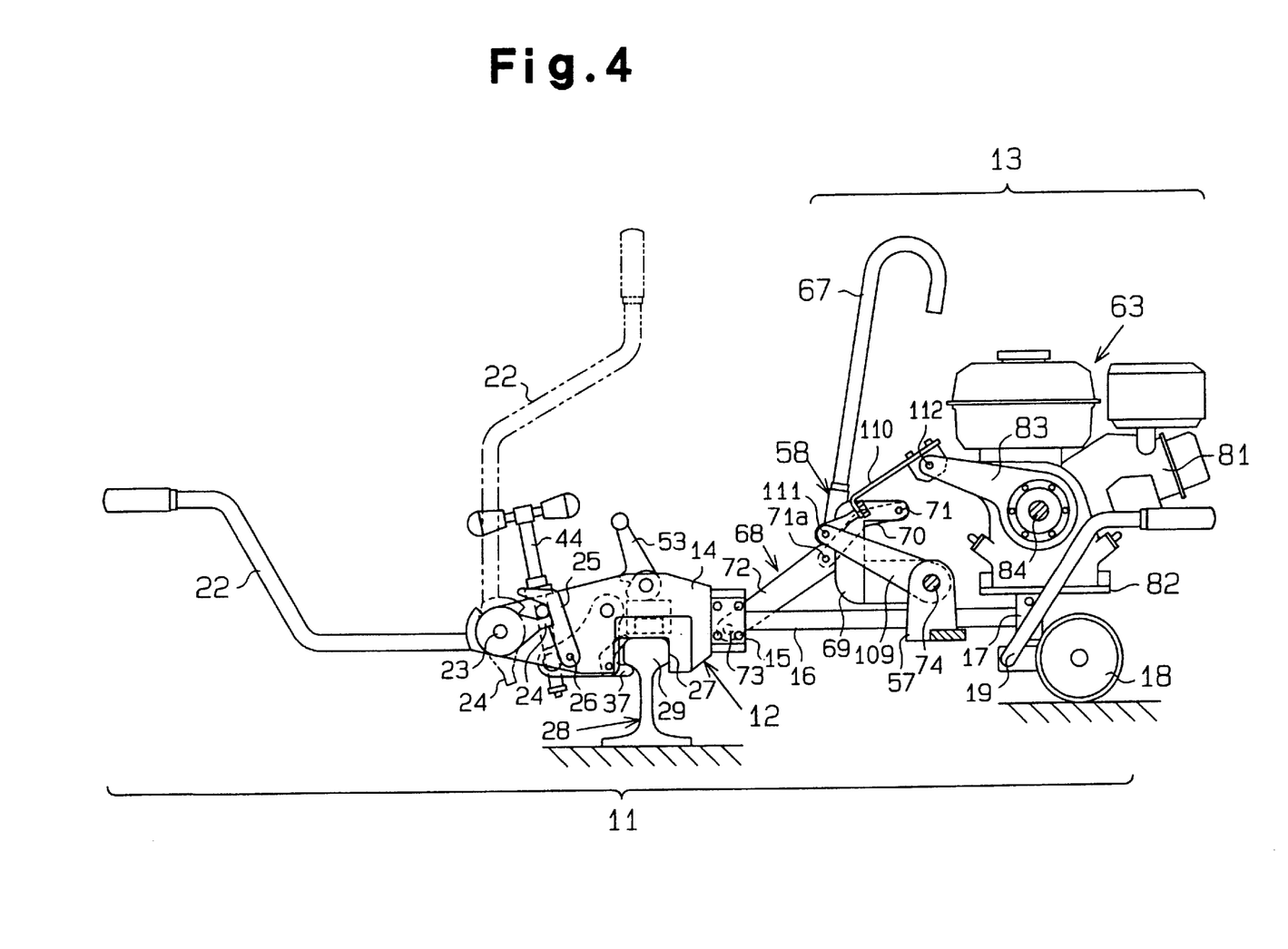
FIG. 4 is a cross sectional view taken along line 4—4 in FIG. 2.

As shown in FIGS. 2 and 4, the operating mechanism 58 is arranged at the right side of the cutter 13. The operating mechanism 58 includes a handle 67 and a link mechanism 68 for transmitting the movement of the handle 67 to the sliding base 57. As shown in FIG. 4, the link mechanism 68 includes two bars 70, 72. The rear end of the bar 70 is pivotably supported by a supporting shaft 71, which is, in turn, supported by a bracket 69. The bracket 69 is fixed to the sliding base 57. The front end of the bar 72 is pivotably supported by a shaft 73, which is supported at the right side of the center frame 15. The front end of the bar 70 and the rear end of the bar 72 are pivotally interconnected by the supporting shaft 71a. The handle 67 is fixed to the bar 72.

If the handle 67 is pivoted forward or rearward, the bar 72 is pivoted along with the handle 67 about the shaft 73. The pivotal movement of the bar 72 is, then, transmitted to the bracket 69 through the bar 70 to slide the sliding base 57 forward or rearward. The entire cutter 13 is moved along with the sliding base 57.

Figure 3:
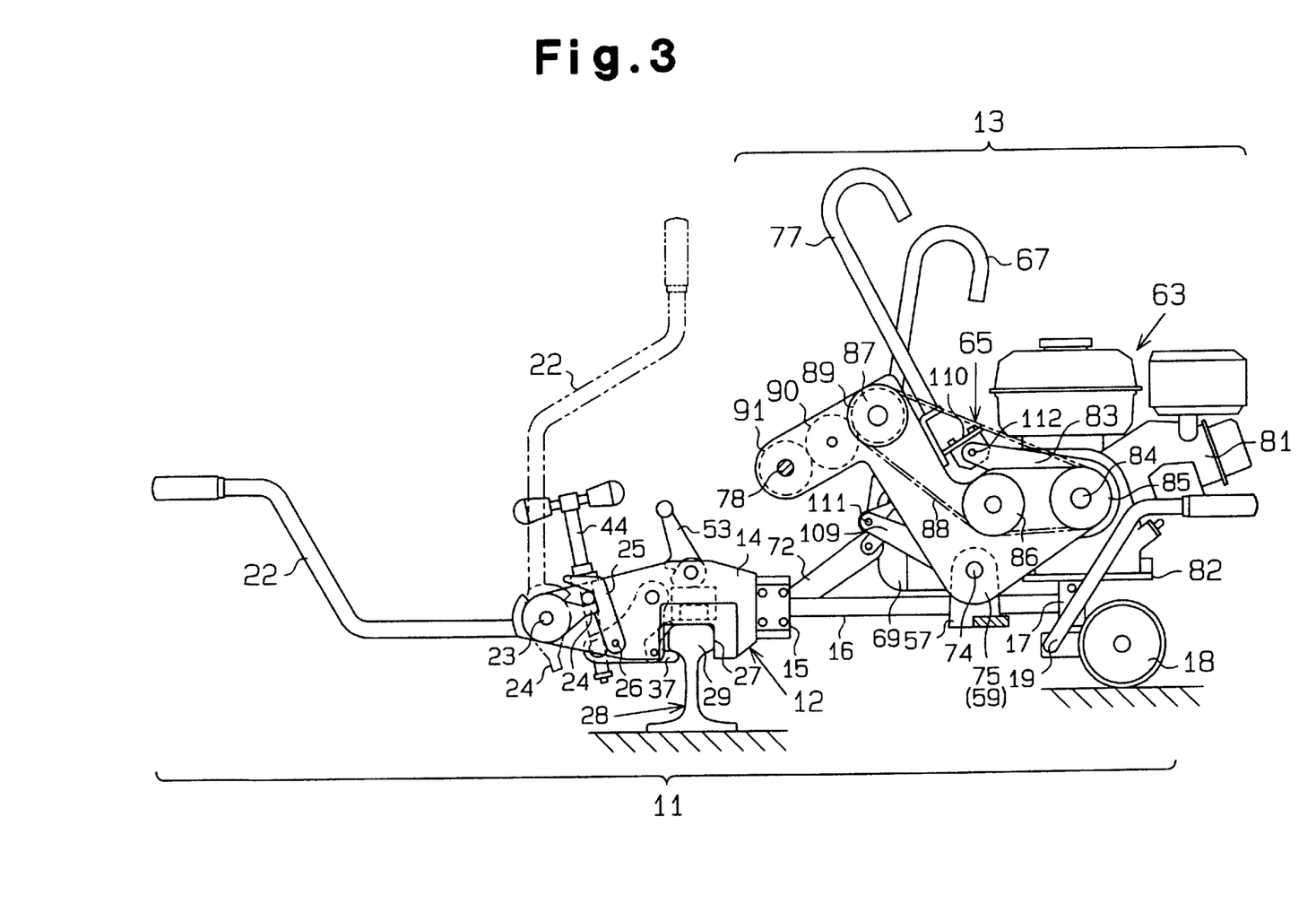
FIG. 3 is a cross sectional view taken along line 3—3 in FIG. 2.

As shown in FIGS. 1 to 3, the support 59 includes a supporting shaft 74 and left and right supporting members 75, 76. The supporting shaft 74 extends horizontally through the sliding base 57 in a direction perpendicular to the longitudinal axis of the frame 11. The supporting shaft 74 is rotatable relative to the sliding base 57. The ends of the supporting shaft 74 are respectively fixed to the left and right supporting members 75, 76. Therefore, the entire support 59 can tilt relative to the frame 11. A handle 77 for tilting the support 59 is attached to the left supporting member 75.

As shown in FIG. 1, the rotatable blade 60 for cutting the rail 28 has a circular shape and is removeably attached to a rotating shaft 78, which is rotatably supported by the left supporting member 75. The blade 60 is rotated along with the rotating shaft 78 by the driving force of the engine 63 to cut the rail 28. The blade 60 can be removed from the rotating shaft 78 and replaced with a new blade.

The blade cover 61 includes a top cover 79 for covering an upper side of the blade 60 and a pair of side covers 80 for covering the sides of the blade 60. The side covers 80 are supported by the top cover 79.

Figure 5:
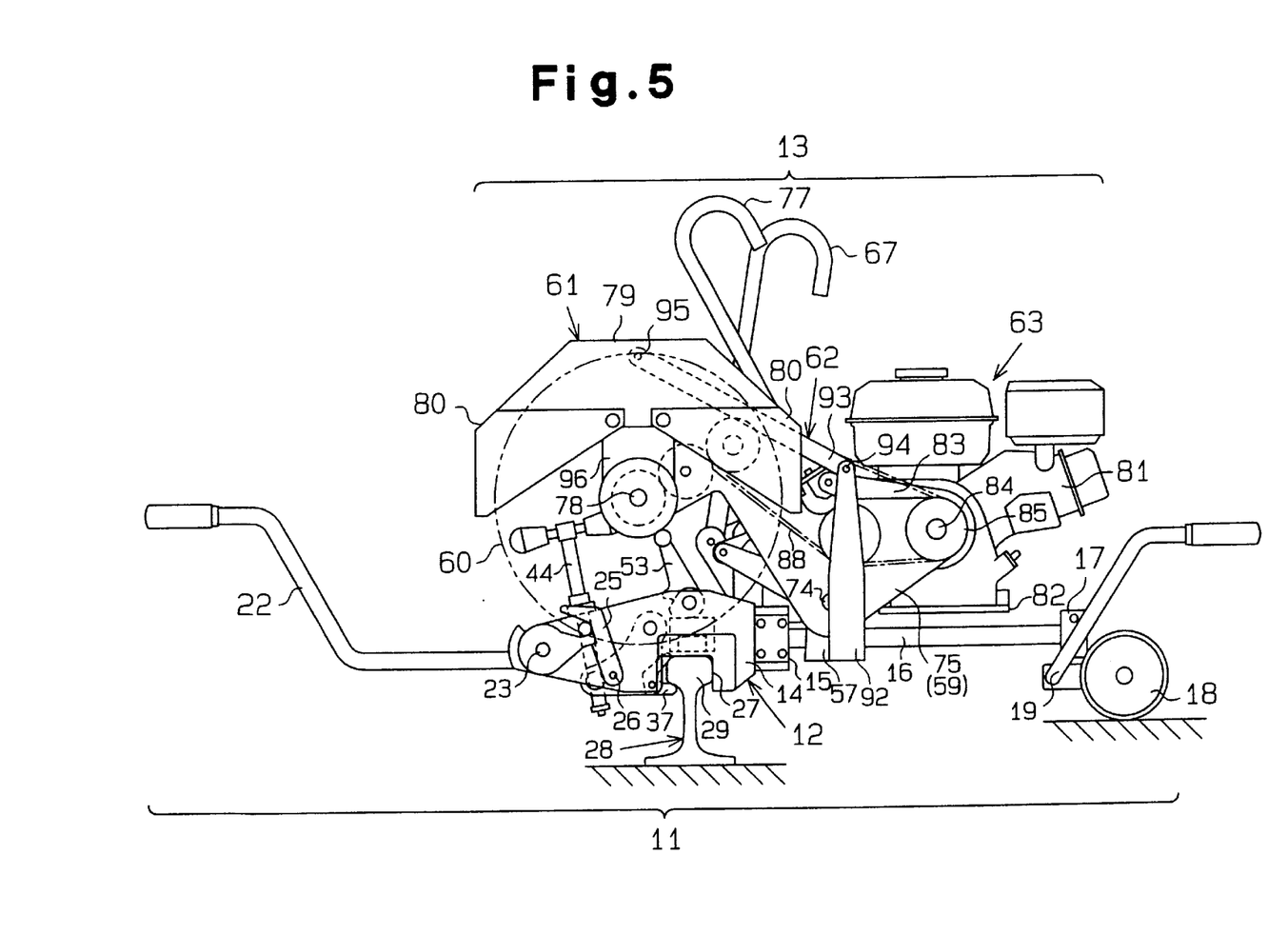
FIG. 5 is a side view of the cutting apparatus showing a cutter in an advanced position.

As shown in FIG. 2, the engine 63 includes a main body 81, a base plate 82 for supporting the main body 81, and a pair of side plates 83, which are fixed to the left and right sides of the main body 81. A shaft 113 extends from the right side of the main body 81 through the right side plate 83 and is rotatably supported by the right supporting member 76 (FIG. 2). A drive shaft 84 extends from the left side of the main body 81 through the left side plate 83 and the left supporting member 75. The drive shaft 84 is rotatably supported by the left supporting member 75. As shown in FIG. 3, a pulley 85 is attached to the distal end of the drive shaft 84. The left supporting member 75 supports the transmission 65, which transmits the driving force from the drive shaft 84 to the rotating shaft 78 to rotate the blade 60 (FIG. 5). The transmission 65 includes the pulley 85, two middle pulleys 86, 87, a belt 88 and gears 89, 90, 91. The belt 88 is supported around the pulleys 85, 86, 87. The gears 89, 90, 91 transmit the rotation of the middle pulley 87 to the rotating shaft 78. Therefore, the blade 60 is rotated by the force of the engine 63 through the transmission 65.

The first link mechanism 62, which supports the blade cover 61, will now be described.

As shown in FIG. 1, a stationary plate 92 is fixed to the sliding base 57 and extends upward from the sliding base 57. When the sliding base 57 is fixed at any point along the guide shafts 16, the guide shafts 16, the sliding base 57 and the stationary plate 92 form an integral rigid structure. Therefore, when the sliding base 57 is fixed on the guide shafts 16, the sliding base 57 and the stationary plate 92 act as part of the frame 11. A bar 93 is pivotally connected to the upper end of the stationary plate 92 with a shaft 94. The top cover 79 of the blade cover 61 is pivotally connected to the distal end of the bar 93 with a supporting shaft 95. A connecting plate 96 is attached to the lower end of the top cover 79. The rotating shaft 78 is rotatably supported by the connecting plate 96.

The first link mechanism 62 can be simplified as a four-bar mechanism as shown in FIGS. 6(a), 6(b) and 8(a), 8(b).

Since the stationary plate 92 is fixed to the sliding base 57, the stationary plate 92 acts as a stationary link 97 of the four-bar mechanism. The support 59, which is connected to the first end of the link 97, acts as a main driving link 98 of the four-bar mechanism. The stationary link 97 and the main driving link 98 form a pair 101 having a pivot axis 105, which is the axis of the shaft 74. The bar 93, which is connected to the second end of the stationary link 97 with the shaft 94, acts as a regulating link 99 of the four-bar mechanism. The stationary link 97 and the regulating link 99 form a pair 102 having a pivot axis 106, which is the axis of the supporting shaft 94. The blade cover 61 and the connecting plate 96 form a rigid link and act as a follower link 100 of the four-bar mechanism between the main driving link 98 and the regulating link 99. The follower link 100 and the main driving link 98 form a pair 103 having a pivot axis 107, which is the axis of the supporting shaft 78. The follower link 100 and the regulating link 99 form a pair 104 having a pivot axis 108, which is the axis of the rotating shaft 95. The four links 97, 98, 99, 100 form a closed constrained chain of links.

In the first link mechanism 62, the stationary link 97 is fixed. Therefore, the main driving link 98 acts as a lever with a fulcrum at the pivot axis 105. The regulating link 99 also acts as a lever with a fulcrum at the pivot axis 106. As a result, the four-bar mechanism includes a double-lever mechanism. The lengths of the opposite links, i.e., the lengths of the stationary link 97 and the follower link 100 and the lengths of the main driving link 98 and the regulating link 99, do not differ significantly from each other. As a result, the follower link 100 moves substantially parallel to the stationary link 97 by the action of two levers 98, 99. That is, any point on the follower link 100 moves approximately along a straight line. Therefore, the first link mechanism 62 is not an exact straight line motion mechanism, but an approximate straight line motion mechanism. Alternatively, the lengths of the opposite links can be the same, so that the first link mechanism 62 is an exact straight line motion mechanism.

The second link mechanism 64 for supporting the engine 63 will now be described. As shown in FIG. 2, the second link mechanism 64 is connected to the side plates 83 between the left and right supporting members 75, 76 of the support 59 to support the engine 63.

As shown in FIG. 4, a bar 109 is fixed to the sliding base 57 and extends from the sliding base 57. Therefore, if the sliding base 57 is fixed at any point along the guide shafts 16, the guide shafts 16, the sliding base 57 and the bar 109 form an integral rigid structure. Therefore, the sliding base 57 and the bar 109 act as part of the frame 11.

As shown in FIG. 2, a substantially T-shaped regulating plate 110 is arranged to interconnect the bar 109 and the side plates 83 of the engine 63. The regulating plate 110 is pivotally connected to the upper end of the bar 109 with a supporting shaft 111. As shown in FIGS. 2 and 4, a supporting shaft 112 extends through the right and left sides of the regulating plate 110. The ends of the supporting shaft 112 are pivotally connected to the side plates 83, which are fixed to both sides of the main body 81 of the engine 63, as described above. As a result, the engine 63 is connected to the sliding base 57 with the supporting shaft 112, the regulating plate 110 and the bar 109. Furthermore, the engine 63 is connected to the sliding base 57 through the drive shaft 84 and the support 59.

The second link mechanism 64 can be simplified as a four-bar mechanism, as shown in FIGS. 7(a), 7(b) and 9(a), 9(b).

The bar 109, the regulating plate 110, the side plates 83 and the support 59 respectively act as a link of the four-bar mechanism.

The bar 109 is fixed to the sliding base 57 and acts as a stationary link 114 of the four-bar mechanism. The stationary link 114 functions as a fixed frame. The support 59, which is connected to the first end of the stationary link 114 with the shaft 74, acts as a main driving link 115. The stationary link 114 and the main driving link 115 form a pair 101a having a pivot axis 105, which is the axis of the shaft 74. The regulating plate 110, which is connected to the second end of the stationary link 114 with the supporting shaft 111, acts as a regulating link 116. The stationary link 114 and the regulating link 116 form a pair 118 having a pivot axis 121, which is the axis of the supporting shaft 111. The side plates 83 between the main driving link 115 and the regulating link 116 act as a follower link 117. The follower link 117 and the main driving link 115 form a pair 119 having a pivot axis 112, which is the axis of the drive shaft 84. The follower link 117 and the regulating link 116 form a pair 120 having a pivot axis 123, which is the axis of the supporting shaft 112. The four links 114, 115, 116 and 117 form a closed constrained chain.

The second link mechanism 64 differs from the first link mechanism 62. The lengths of the opposite links, i.e., lengths of the stationary link 114 and the follower link 117, and lengths of the main driving link 115 and the regulating link 116 are substantially the same. That is, the four links form a parallelogram. Since the stationary link 114 is fixed, the follower link 117, which is opposite to the stationary link 114, always moves parallel to the stationary link 114. That is, the second link mechanism 64 is a four-bar mechanism that produces exact straight line motion. More specifically, the engine 63 always moves without being tilted since the angle between the side plates 83, which support the engine 63, and the frame 11 is constant. Alternatively, the lengths of opposite links, i.e., lengths of the stationary link 114 and the follower link 117, and lengths of the main driving link 115 and the regulating link 116, can differ from each other to produce approximate straight line motion.

Operation of the cutting apparatus will now be described.

The cutter 13 moves in a direction parallel to the guide shafts 16 between the retracted position (FIGS. 1 to 4) and the advanced position (FIG. 5). Operation of the first and second link mechanisms 62, 64 and the movement of the engine 63 will be described with reference to FIGS. 6 and 7.

Figure 6A:
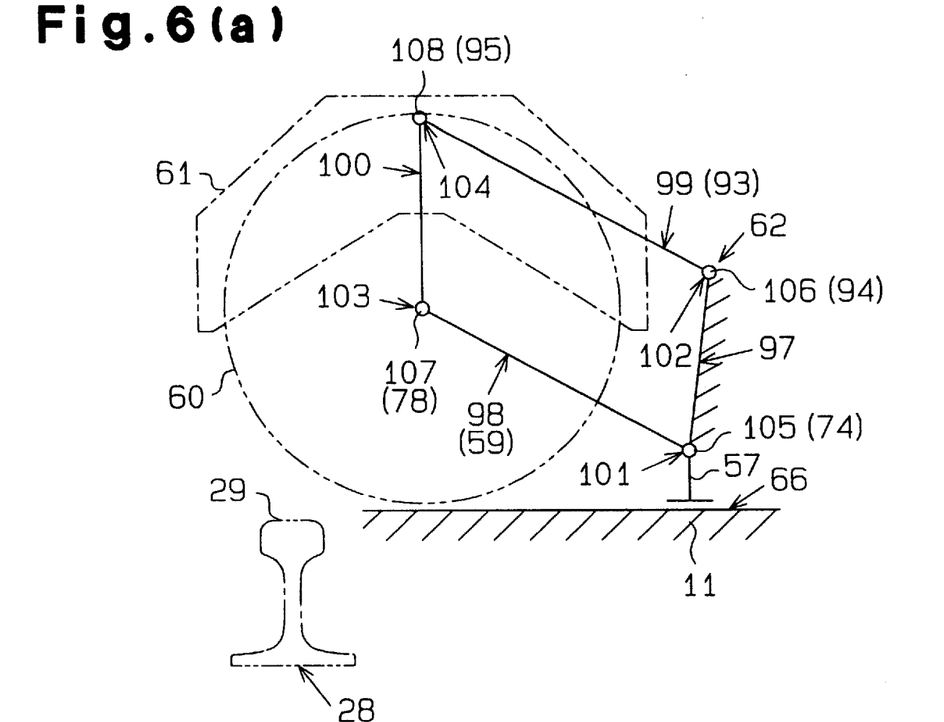
FIG. 6(a) is a diagrammatic side view of a first link mechanism in a retracted position.

In the retracted position, as shown in FIG. 6(a), the pivot axis 107 of the rotating shaft 78, which supports the blade 60, is positioned rearward of the rail 28. In this position, if the handle 77 is turned toward the rail 28, the support 59 is tilted downward about the pivot axis 105 of the supporting shaft 74. Likewise, the rotatable blade 60 moves downward with the rotating shaft 78. Then, as shown in FIG. 6(b), the rail 28, which is held by the positioning device 12, is cut by the rotatable blade 60.

Figure 6B:
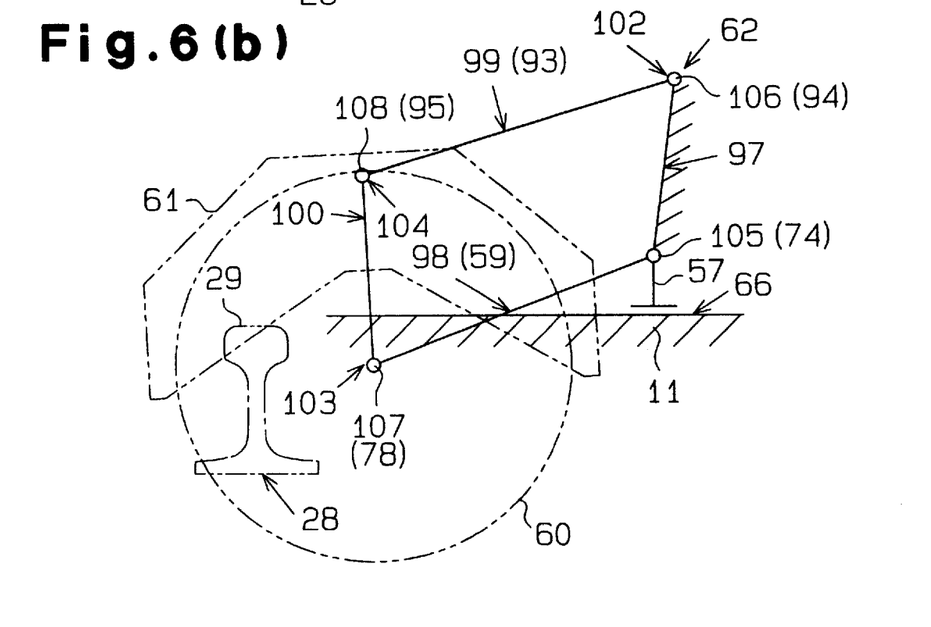
FIG. 6(b) is a diagrammatic side view of the first link mechanism of FIG. 6(a) showing the rail being cut.

During the retracted position cutting operation of FIGS. 6(a) and 6(b), the pivot axis 107 moves approximately parallel to the stationary link 97 (the stationary plate 92). That is, the rotating shaft 78 moves approximately in a vertical direction rearward of the rail 28. The blade cover 61, which is supported by the supporting shaft 95 of the first link mechanism 62, also moves approximately in a vertical direction while keeping its initial attitude.

Figure 7A:
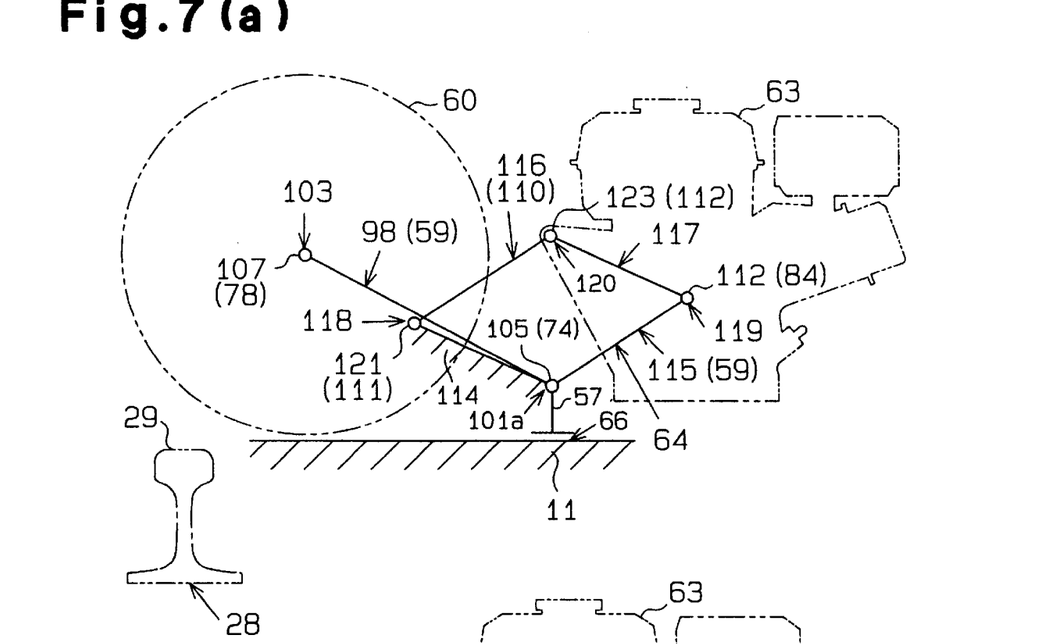
FIG. 7(a) is a diagrammatic side view of a second link mechanism in a retracted position.
Figure 7B:
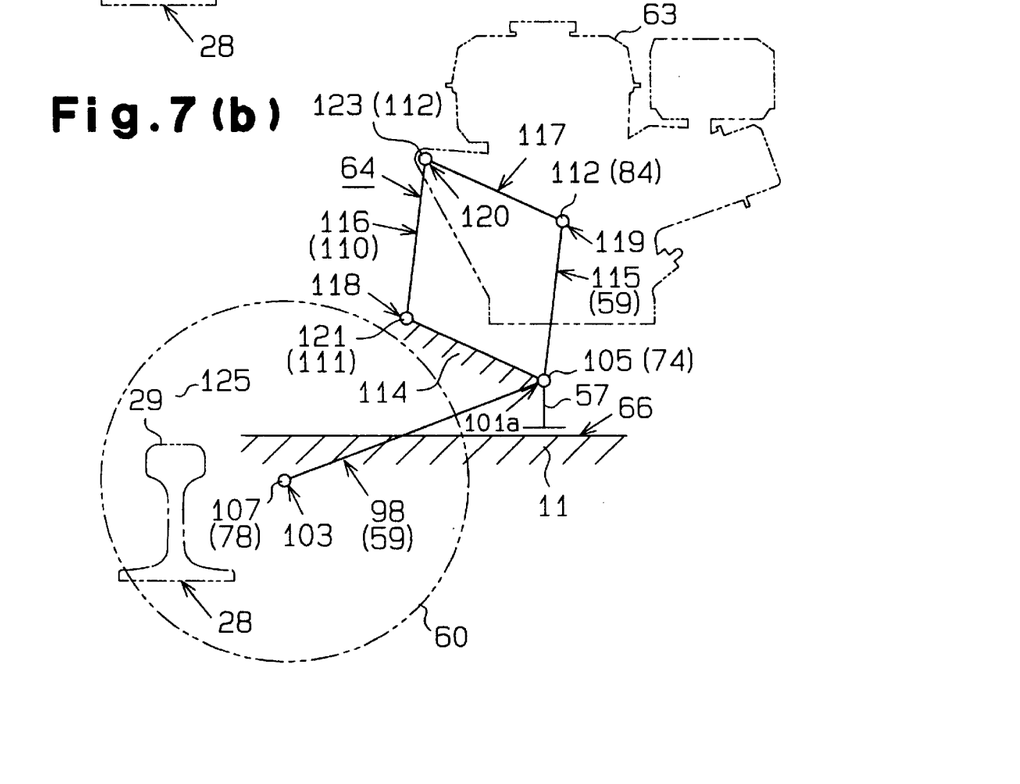
FIG. 7(b) is a diagrammatic side view of the second link mechanism of FIG. 7(a) showing the rail being cut.

Since both the rotating shaft 78 of the first link mechanism 62 and the drive shaft 84 of the second link mechanism 64 are rotatably supported by the left supporting member 75, the downward movement of the rotating shaft 78 causes the drive shaft 84 to move forward about the supporting shaft 74, as shown in FIGS. 7(a) and 7(b). The movement of the drive shaft 84 causes the entire second link mechanism 64 and the engine 63 to move. During this movement, the engine 63 substantially maintains its initial attitude.

Operation of the first and second link mechanisms 62, 64 and the movement of the blade cover 61 and the engine 63 in the advanced position will now be described with reference to FIGS. 8 and 9. This description focuses mainly on the differences between the retracted position and the advanced position.

Figure 8A:
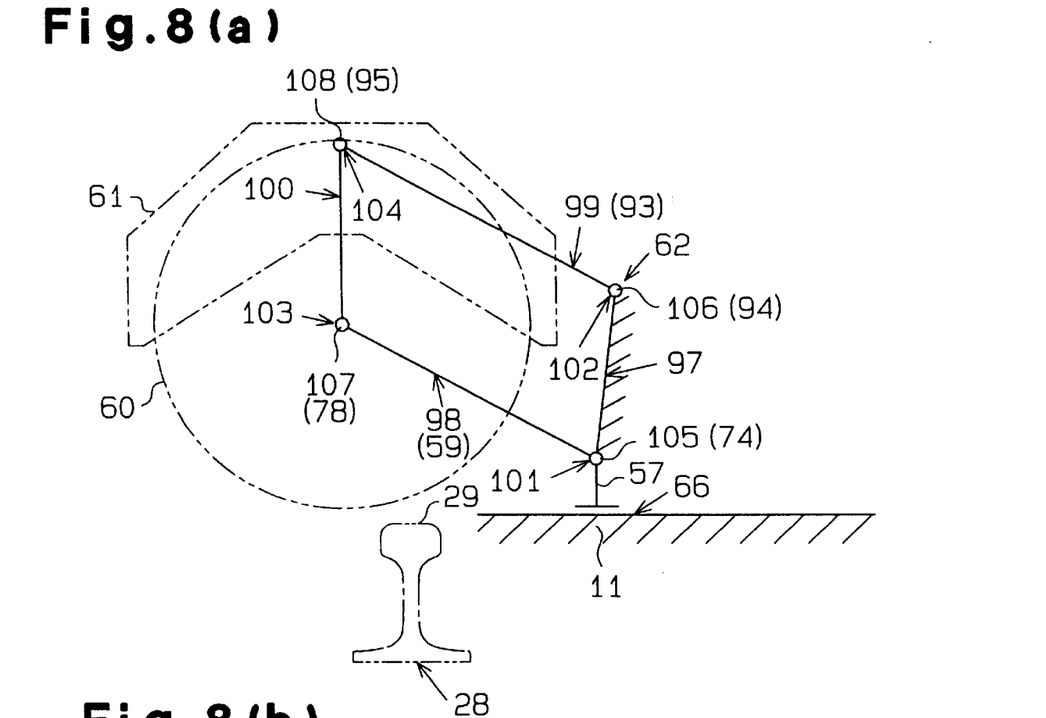
FIG. 8(a) is a diagrammatic side view of the first link mechanism in an advanced position.
Figure 8B:
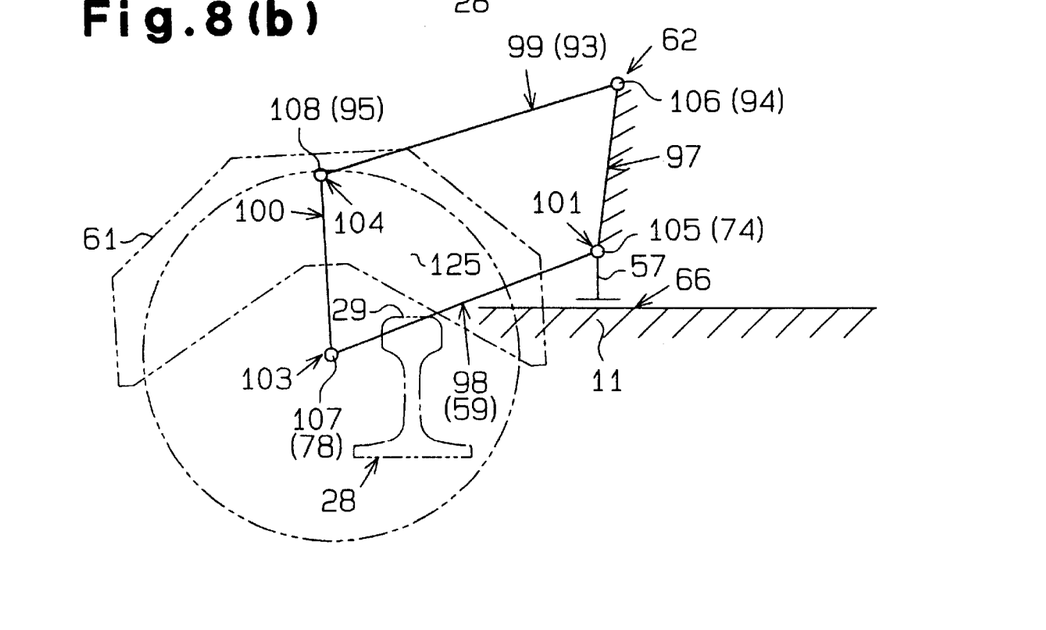
FIG. 8(b) is a diagrammatic side view of the first link mechanism of FIG. 8(a) showing the rail being cut.

As shown in FIG. 8(a), in the advanced position, the pivot axis 107 of the rotating shaft 78 is positioned forward of the rail 28. In this position, the handle 77 is turned downward to cut the rail 28, which is held by the positioning device 12, as shown in FIG. 8(b).

During the advanced position cutting operation, the rotating shaft 78 moves approximately in a vertical direction forward of the rail 28. The blade cover 61, which is supported by the supporting shaft 95 of the first link mechanism 62, also moves approximately in a vertical direction while substantially maintaining its initial attitude.

Figures 9A, 9B:
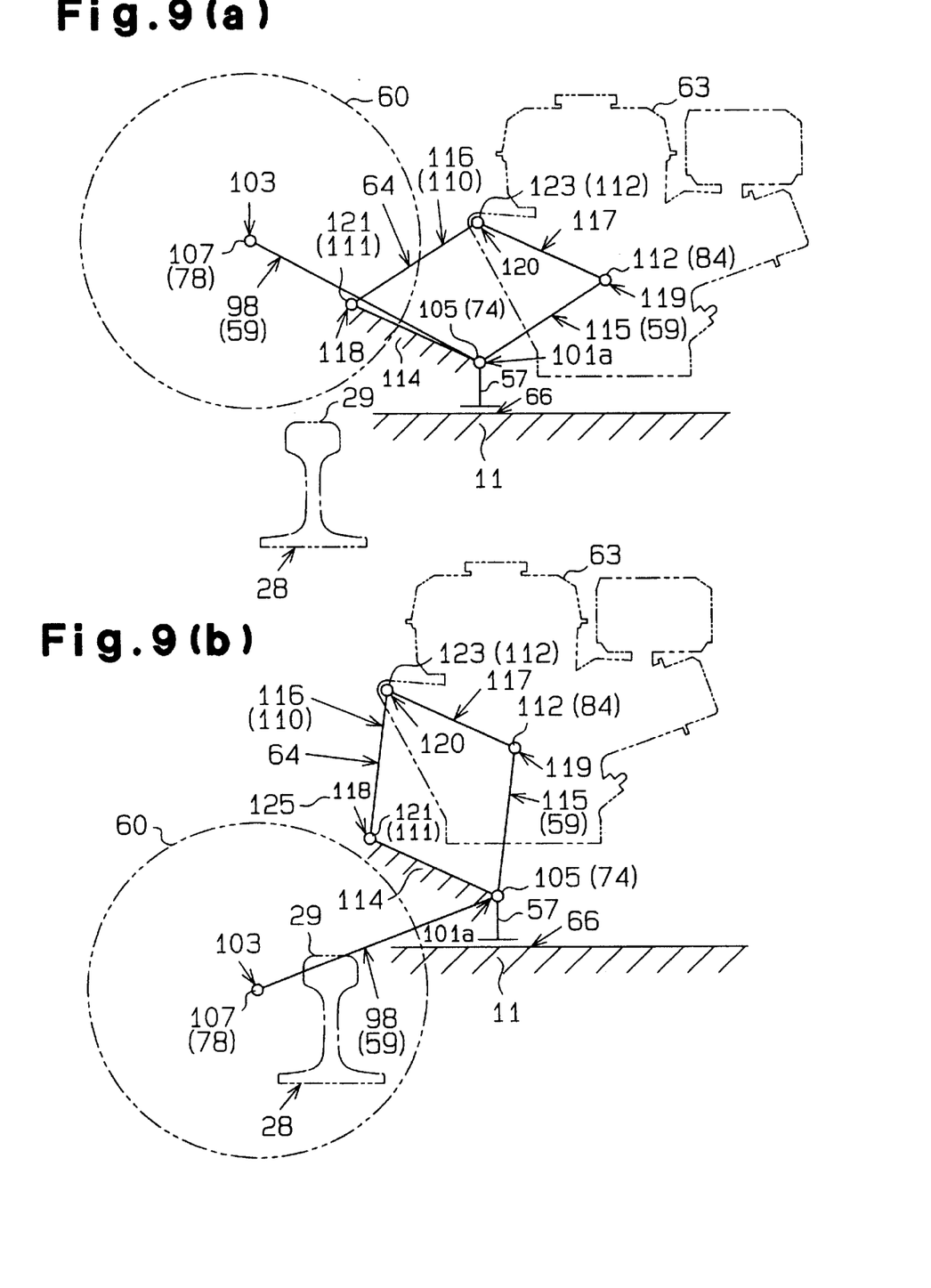
FIG. 9(a) is a diagrammatic side view of the second link mechanism in an advanced position.
FIG. 9(b) is a diagrammatic side view of the second link mechanism of FIG. 9(a) while cutting the rail.

FIGS. 9(a) and 9(b) show the movement of the second link mechanism 64 during the advanced position cutting operation. Like in the retracted position, the downward movement of the rotating shaft 78 causes the drive shaft 84 to move forward about the supporting shaft 74. The movement of the drive shaft 84 causes the entire second link mechanism 64 and the engine 63 to move. During this movement, the engine 63 substantially maintains its initial attitude.

The cutting apparatus according to the first embodiment of the present invention provides following advantages.

During the cutting operation, the blade cover 61 moves approximately in a vertical direction while maintaining its initial attitude. Therefore, the blade cover 61 avoids contact with obstacles on or near the rail 28.

During the cutting operation, the engine 13 always maintains its initial attitude. Therefore, the engine 63 does not tilt and contact obstacles on or near the rail 28. Furthermore, the oil level of the engine 63 and the position of the float of the carburetor will not be significantly changed, so the engine performance is not affected by the cutting operation.

The first link mechanism 62 and the second link mechanism 64 each form a four-bar mechanism. That is, the movements of the blade cover 61 and the engine 63 are conducted with the simple link mechanisms 62, 64.

The sliding base 57, which supports the support 59, slides along the guide shafts 16, so that the cutter 13 can move toward or away from the positioning device 12. Therefore, the position of the blade 60 relative to the rail 28 can be changed to modify the cutting angle of the blade 60 relative to the rail 28. As a result, the rail 28 can be cut according to the operator's needs.

In the positioning device 12, the rail 28 is supported at three locations. That is, two front corners of the rail head 29 are supported by the engaging parts 39 of the pawl 37. Furthermore, the rear side of the rail head 29 is supported by the inner walls 31 of the recesses 27. As a result, the rail 28 is securely held by the positioning device 12 for secure cutting of the rail 28.

The cutting apparatus according to the first embodiment of the present invention can be modified as follows.

Other known types of clamping mechanisms can be substituted for the clamp of FIGS. 10 and 11.

The second link mechanism 64 can be eliminated. In this instance, an electric motor or pneumatic motor can be used as the driver. The motor is directly attached to the support 59 and tilts along with the support 59.

In the first embodiment, the first link mechanism 62 can be eliminated. In this instance, the blade cover 61 is directly attached to the support 59 and tilts along with the support 59.

Instead of using a four-bar mechanism, any link mechanism that can change the positions of the blade cover 61 and the engine 63 relative to the support 59 can be used for the first link mechanism 62 and the second link mechanism 64. For example, the number of links and the number of the pairs can be changed.

The guide shafts 16 can be constructed as follows to provide more strength.

A front clamp plate is attached to the front ends of two parallel chrome molybdenum steel rods. Then, a pair of parallel pipes are slid over the rods from their rear ends, and the pipes are brought into contact with the front clamp plate. A rear clamp plate with a pair of receiving holes to receive the rods is used to connect the rear ends of the rods. The rear clamp plate slidably receives the rear ends of the rods. The rear clamp plate is then brought into contact with the rear ends of the pipes. Then, a nut is installed onto each rod from the rear end. Then, the nuts are tightened to clamp the pipes between the front clamp plate and the rear clamp plate. This creates rigid pre-stressed guide shafts 16. These pre-stressed guide shafts 16 are connected between the supporting members (frames 15 and 17).

Furthermore, a connecting plate can be installed between the supporting members (frames 15 and 17) to strengthen the pre-stressed slide bars and the supporting members, forming a rigid-framed structure.

Therefore, the present examples and embodiments are to be considered as illustrative and not restrictive and the invention is not to be limited to the details given herein, but may be modified within the scope and equivalence of the appended claims.

What is claimed is:

1. A cutting apparatus for cutting an elongated workpiece comprising:
   a rotatable blade for cutting the workpiece;
   a blade cover for covering the blade;
   a driver for driving the blade;
   a frame for supporting the blade, the blade cover and the driver;
   a cover support link mechanism located between the frame and the blade cover; and
   a driver support link mechanism located between the frame and the driver; wherein the cover support link mechanism permits the blade cover to move while maintaining substantially the same attitude during cutting, wherein the driver support link mechanism is a four-link mechanism consisting of a first stationary link fixed to the frame, a first follower link connected to the driver and parallel to the first stationary link, a first main driving link, and a first regulating link, wherein the first stationary link connects the first main driving link and the first regulating link, and the first follower link connects the first main driving link and the first regulating link, wherein the length of the first stationary link is substantially equal to that of the first follower link, and the length of the first regulating link is substantially equal to that of the first main driving link, and wherein the driver support link mechanism moves the driver while the driver maintains a substantially constant attitude;
   wherein the cover support link mechanism is a constrained link chain, and wherein the cover support link mechanism is a four-link mechanism consisting of a second stationary link fixed to the frame, a second follower link connected to the blade cover and parallel to the second stationary link, a second main driving link, and a second regulating link, wherein the second stationary link connects the second main driving link and the second regulating link, and the second follower link connects the second driving link and the second regulating link, wherein the second regulating link is substantially parallel to the second main driving link.

2. A cutting apparatus according to claim 1, wherein the driver support link mechanism moves in conjunction with the movement of the cover support link mechanism when the rotatable blade is moved for cutting the workpiece.

3. A cutting apparatus according to claim 1, wherein the driver support link mechanism is a constrained link chain.

4. A cutting apparatus for cutting an elongated workpiece comprising:
   a rotatable blade for cutting the workpiece;
   a blade cover for covering the blade;
   a driver for driving the blade;
   a frame for supporting the blade, the blade cover and the driver;
   wherein the driver support link mechanism is a four-link mechanism consisting of a first stationary link fixed to the frame, a first follower link connected to the driver and parallel to the first stationary link, a first main driving link, and a first regulating link, wherein the first stationary link connects the first main driving link and the first regulating link, and the first follower link connects the first main driving link and the first regulating link, wherein the length of the first stationary link is substantially equal to that of the first follower link, and the length of the first regulating link is substantially equal to that of the first main driving link, and wherein the driver support link mechanism moves the driver while the driver maintains a substantially constant attitude during cutting; and
   a cover support link mechanism located between the frame and the blade cover, wherein the cover support link mechanism permits the blade cover to move while maintaining substantially the same attitude during cutting, wherein the cover support link mechanism is a four-link mechanism consisting of a second stationary link fixed to the frame, a second follower link connected to the blade cover and parallel to the second stationary link, a second main driving link, and a second regulating link, wherein the second stationary link connects the second main driving link and the second regulating link, and the second follower link connects the second driving link and the second regulating link, wherein the second regulating link is substantially parallel to the second main driving link.

* * * * *